(12) United States Patent
Jantzi et al.

(10) Patent No.: US 12,425,808 B2
(45) Date of Patent: Sep. 23, 2025

(54) ASSET TRACKING DEVICES AND MOBILE NETWORK PLAN SELECTION

(71) Applicant: BlackBerry Limited, Waterloo (CA)

(72) Inventors: Jason Wayne Jantzi, St. Clements (CA); Ryan Anthony Bivinetto, Houston, TX (US); Mark Edward Reaume, Waterloo (CA); Adam Paul Jocksch, Waterloo (CA)

(73) Assignee: BlackBerry Limited, Waterloo (CA)

( * ) Notice: Subject to any disclaimer, the term of this patent is extended or adjusted under 35 U.S.C. 154(b) by 395 days.

(21) Appl. No.: 18/175,654

(22) Filed: Feb. 28, 2023

(65) Prior Publication Data

US 2024/0292185 A1    Aug. 29, 2024

(51) Int. Cl.
| | |
|---|---|
| H04W 4/029 | (2018.01) |
| G06Q 10/0833 | (2023.01) |
| G08B 13/24 | (2006.01) |
| H04L 41/0833 | (2022.01) |
| H04W 64/00 | (2009.01) |

(52) U.S. Cl.
CPC ........ *H04W 4/029* (2018.02); *G06Q 10/0833* (2013.01); *G08B 13/2402* (2013.01); *H04L 41/0833* (2013.01); *H04W 64/003* (2013.01)

(58) Field of Classification Search
CPC ............... H04W 4/029; H04W 64/003; G06Q 10/0833; H04L 41/0833; G08B 13/2402

USPC ....................................................... 455/456.1
See application file for complete search history.

(56) References Cited

U.S. PATENT DOCUMENTS

| | | | |
|---|---|---|---|
| 11,477,668 B2 | 10/2022 | Anand | |
| 2006/0183487 A1 | 8/2006 | Allen et al. | |
| 2016/0192312 A1 | 6/2016 | Lambert et al. | |
| 2019/0261135 A1* | 8/2019 | Chen | ........................ H04W 4/80 |
| 2021/0065259 A1* | 3/2021 | Luong | ................ G06Q 30/0282 |
| 2021/0112423 A1* | 4/2021 | Maheshwari | ....... H04W 36/322 |
| 2022/0104040 A1 | 3/2022 | Zhang | |

FOREIGN PATENT DOCUMENTS

| | | |
|---|---|---|
| EP | 071070569 | 10/2008 |
| WO | 2022221723 | 10/2022 |

OTHER PUBLICATIONS

EESR dated Jul. 4, 2024; European Application No. 24157776.6.
EESR dated Jul. 2, 2024; European Application No. 24157783.2.

* cited by examiner

*Primary Examiner* — Michael R Neff
(74) *Attorney, Agent, or Firm* — Conley Rose, P.C.; J. Robert Brown, Jr.

(57) ABSTRACT

Methods and systems for automatically selecting a mobile network rate plan for an asset tracking device based on a set of reported geolocations of the device overtime, coverage data for various mobile networks, and a set of possible network rate plans. A change in mobility rate plans may be implemented through remote provisioning of a new mobile network profile to the asset tracking device.

20 Claims, 8 Drawing Sheets

ASSET TRACKING DEVICES AND MOBILE NETWORK PLAN SELECTION

FIELD

The present application generally relates to asset tracking devices and the challenges presented by dead zones or low-quality network coverage in some geographical areas.

BACKGROUND

Asset tracking devices may be attached to shipping containers, train cars, truck frames, or other items for which a user wishes to track geographical locations. The asset tracking devices typically obtain location data using satellite signals, if available, cellular triangulation, or using other methods. The devices then periodically obtain a data connection over a cellular network and transmit a location report to a central server. A registered user account having one or more associated tracking devices may enable a user to log into the central server to obtain information regarding the location or location history of their associated tracking devices.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
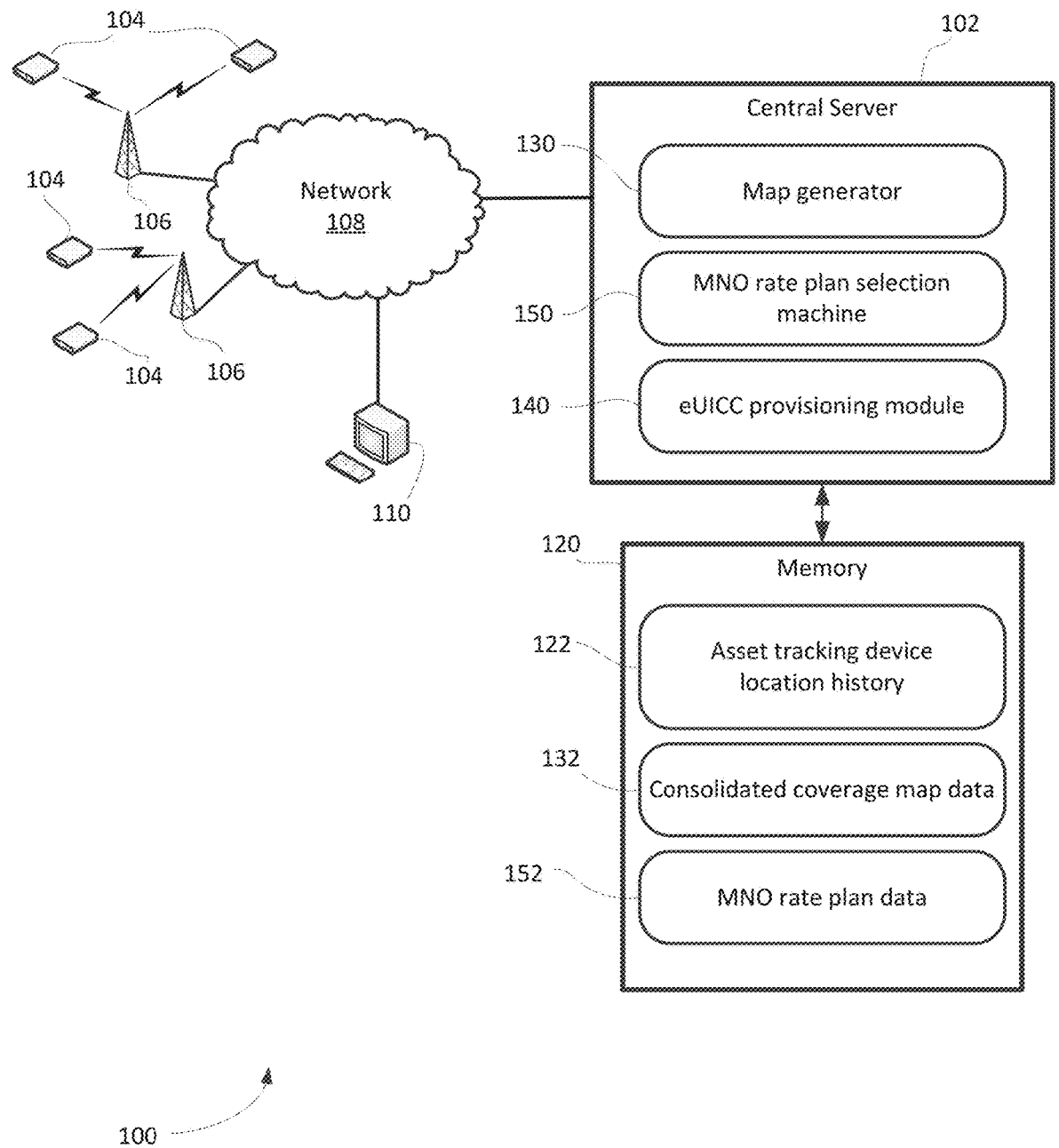
FIG. 1 shows an example system for communicating with and monitoring a set of asset tracking devices.

In a first aspect, the present application describes a computer-implemented method. The method may include receiving, over a computer network, and storing, a plurality of location reports from each of a plurality of asset tracking devices deployed in various locations, each of the location reports including, at least, a geolocation and a mobile network identifier; building, for each respective mobile network identifier, consolidated coverage map data associated with a mobile network operator corresponding to the respective mobile network identifier, wherein the consolidated coverage map data includes geographic locations at which the respective mobile network identifier has been reported in one or more of the location reports; receiving a request from a user device; and providing to the user device for display as an overlay to a geographic map, at least a portion of the consolidated coverage map data for at least one of the mobile network operators.

In some implementations, the consolidated coverage map data includes geographical data defining geographic areas of mobile network coverage for the associated mobile network operator. In some cases, the geographical data includes data defining a boundary of the mobile network coverage. The method may further include receiving a most-recent location report from a first asset tracking device and determining that a most-recent geolocation in the most-recent location report with within a threshold distance from the boundary and, responsive thereto, transmitting a notification to a user account associated with the first asset tracking device. In some cases, the method further includes receiving at least one location report from a first asset tracking device and determining a predicted travel path associated with the first asset tracking device based on geolocation data of the first asset tracking device in the at least one location report.

In some of those cases, the method may further include determining that the predicted travel path crosses the boundary and, in response thereto, transmitting a notification to a user account associated with the first asset tracking device regarding an expected loss of cellular network coverage. In some implementations, determining that the predicted travel path crosses the boundary include determining that the predicted travel path is projected to cross the boundary within a threshold distance.

In some implementations, building the consolidated coverage map data includes, for one of the geolocations, determining a coverage area around the geolocation and including the coverage area in the geographical data defining geographic areas of mobile network coverage. The method may further include determining a size of the coverage area, and wherein the size of the coverage area is determined based on a signal strength measurement associated with the geolocation in one of the location reports.

In another aspect, the present application describes a computer-implemented method. The method may include receiving, over a computer network, and storing, a plurality of location reports from an asset tracking device, each of the location reports including, at least, geolocation data and a mobile network identifier, wherein the asset tracking device operates using a first mobile network plan associated with a first mobile network operator, the geolocation data providing a location history for the asset tracking device; detecting a trigger to re-determine mobile network plan and, in response, inputting the geolocation data for the asset tracking device to a machine learning model configured to select a cost-optimized mobile network plan from among a set of defined mobile network plans based on the geolocation data; and comparing the cost-optimized mobile network plan with the first mobile network plan and, responsive to the comparison, causing provisioning of subscription credentials to the asset tracking device to enable it to obtain network connectivity using the cost-optimized mobile network plan.

In some implementations, the trigger includes a periodically-occurring time. The periodically-occurring time may have a period of monthly, bi-monthly, semi-annually, or annually in some cases.

In some implementations, detecting the trigger includes detecting a change in the set of defined mobile network plans.

In some implementations, detecting the trigger further includes determining that the plurality of location reports include more than a minimum number of geolocation pinpoints for the asset tracking device.

In some implementations, detecting the trigger further includes determining that the plurality of location reports define more than a minimum threshold number of trips by the asset tracking device.

In some implementations, detecting the trigger further includes determining, from the plurality of location reports, a confidence measure indicative of a probability that the geolocation data indicates a location range for the asset tracking device. In some cases, determining the confidence measure is partly based on a count of trips or a count of geolocation data pinpoints represented by the plurality of location reports, and party based on a determining a variance value with respect to the trips or the geolocation data pinpoints.

In some implementations, inputting the geolocation data further includes inputting, to the machine learning model, mobile network coverage data for each mobile network in the set of defined mobile network plans.

In another aspect, the present application provides a system or a computing device having a processor and memory storing processor executable instructions that, when executed by the processor, cause the processor to carry out one or more of the described methods.

In a further aspect the present application describes a non-transitory computer-readable medium storing processor-executable instructions that, when executed by a processor, are to cause the processor to carry out one or more of the described methods.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to asset tracking devices. These devices may be attached to shipping containers, train cars, truck frames, or other items for which a user wishes to track geographical location. Asset tracking devices typically contain a global navigation satellite system (GNSS) chip or other such hardware for obtaining location data using satellite signals. In some cases, the devices may be configured to use cellular triangulation, WiFi location determination, short range beacon location data, or other such location technologies, for example in the cases where GNSS signals cannot be obtained, such as indoors or when an object or geography blocks the device's ability to obtain the requisite number of satellite signals.

Asset tracking devices typically contain a cellular transceiver that enables them to periodically obtain a data connection over a cellular network and transmit a location report to a central server. The location report may contain one or more geolocation determinations or geolocation data, timestamps for when the data was obtained, and other such information. The central server may provide an interface that enables a registered user account having one or more associated tracking devices to log into the central server to obtain reported information regarding the location or location history of their associated tracking devices.

FIG. 1 shows an example system 100 for asset tracking. The system 100 may include central server 102 and a plurality of asset tracking devices 104 deployed in various locations. The devices 104 may be in one country or many countries, and may be attached to various items, such as tractor trailers, shipping containers, train chassis, truck chassis, shipping pallets, and the like. The devices 104 may include one or more inertial measurement units (IMUs) for determining if the device 104 is stationary or in motion, such as an accelerometer. The devices 104 may include one or more geolocation determination devices, such as a GNSS chip. The devices 104 may also include a cellular transceiver that enables them to receive signals from one or more nearby cellular towers 106 forming part of a mobile data network. The mobile data networks are interconnected with other data networks, such as the Internet in a computer network 108 to provide for worldwide data connectivity and communications capability. The devices 104 are thus able to send and receive data with the central server 102 from any location in the world in which they are able to obtain a cellular data connection through a mobile data network. In some cases, the devices 104 may also include a WLAN chip, such as a WiFi chip set, that enables shorter-range wireless communications access to the computer network 108.

The devices 104 may be configured to operate in a low power mode most of the time to conserve battery power, given that they may be deployed in the field for many years at a time. In some implementations, the devices 104 may be configured to awaken from a low power state periodically to obtain location data and to report location data to the central server 102. In some cases, the periodicity may vary depending on whether the device 104 is in motion. For example, if the device 104 determines, from its IMU that it is not in motion and/or from a comparison of current location data to previous location data that it has not moved, then it may set a longer period of time before its next awakening, such as every 30 minutes, hour, 2 hours, 6 hours, etc. If the device 104 determines, from the IMU and/or from the location data, that it is in motion then it may set a shorter time period, such as 5 minutes, 10 minutes, 15 minutes, etc.

The periodicity with which the device 104 seeks a cellular data connection and sends a location report may be the same or may be different from the periodicity with which the device 104 awakens and obtains location data. In some cases, the reporting may occur less frequently than the location data recordings, particularly if the device 104 is in motion. For instance, if the device obtains location data every 5 minutes, it may be configured to only report the accumulated location data and timestamps every 30 or 60 minutes, to save power.

In some cases, when the device 104 seeks network connectivity via its cellular transceiver it may fail to locate a cellular tower 106 with which it can establish a connection. In such situations, the device 104 may be in a 'dead-zone' with respect to the mobile network operator with which it is configured to operate. The owner or operator of the device 104 may therefore not receive an expected location report from the asset tracking device 104 for as long as the device 104 is in a geographic area in which cellular connectivity is unavailable. This can be for long periods of time in some cases, such as when the device 104 is on a ship, or if the device 104 is stationary in a "dead-zone", e.g. located in a container yard or the like with poor or no cellular coverage.

Owners or operators of the asset tracking devices 104 may each have an associated user account with the central server 102 that enables them to remotely log into, or otherwise connect with, the central server 102, such as through an API via a mobile application or using other such technology. By way of a user device 110, the user may send and receive communications with the central server 102 regarding one or more of the asset tracking devices 104 associated with the user account, including receiving data regarding the reported location of the asset tracking devices 104. It will be understood that various authentication and verification processes may be imposed by the central server 102 to ensure that data regarding one of the devices 104 is only provided to an authorized user account with which the device 104 is associated.

The central server 102 may provide data, including geographical location data, to eh user device 110 that enables the user device 110 to output a graphical user interface showing, as an overly atop of a map rendering, the location of one of the devices 104. The overlay may include a symbol or marker rendered at the location in the GUI atop the map corresponding to the geographical location last reported by the device 104 in its location reports. In some cases, additional information may be made available for display on the client device 110 by the central server 102. Location reports may include information such as latitude and longitude coordinates and data obtain by the device 104 from cellular tower signals that it is able to receive. The cellular data may include, for example, cellular tower identifier (i.e. Cell ID or CID), Radio Access Technology (RAT) such as GSM, UMTS, LTE, 5G, etc., cellular band, RSSI readings, mobile country code (MCC), Mobile Network Code (MNC), mobile network operator (MNO) identifier, location area code (LAC), and other such data.

In some implementations, the device 104 may include other sensors, such as a temperature sensor, humidity sensor, vibration sensor, or other environmental sensors. That sensor data may be included in one or more of the location reports. In some cases, one or more sensors or other instruments may be contained in different physical unit from the device 104 and may communicate with the device using a low-power short range communication protocol, such as Bluetooth™ for example.

Figure 2:
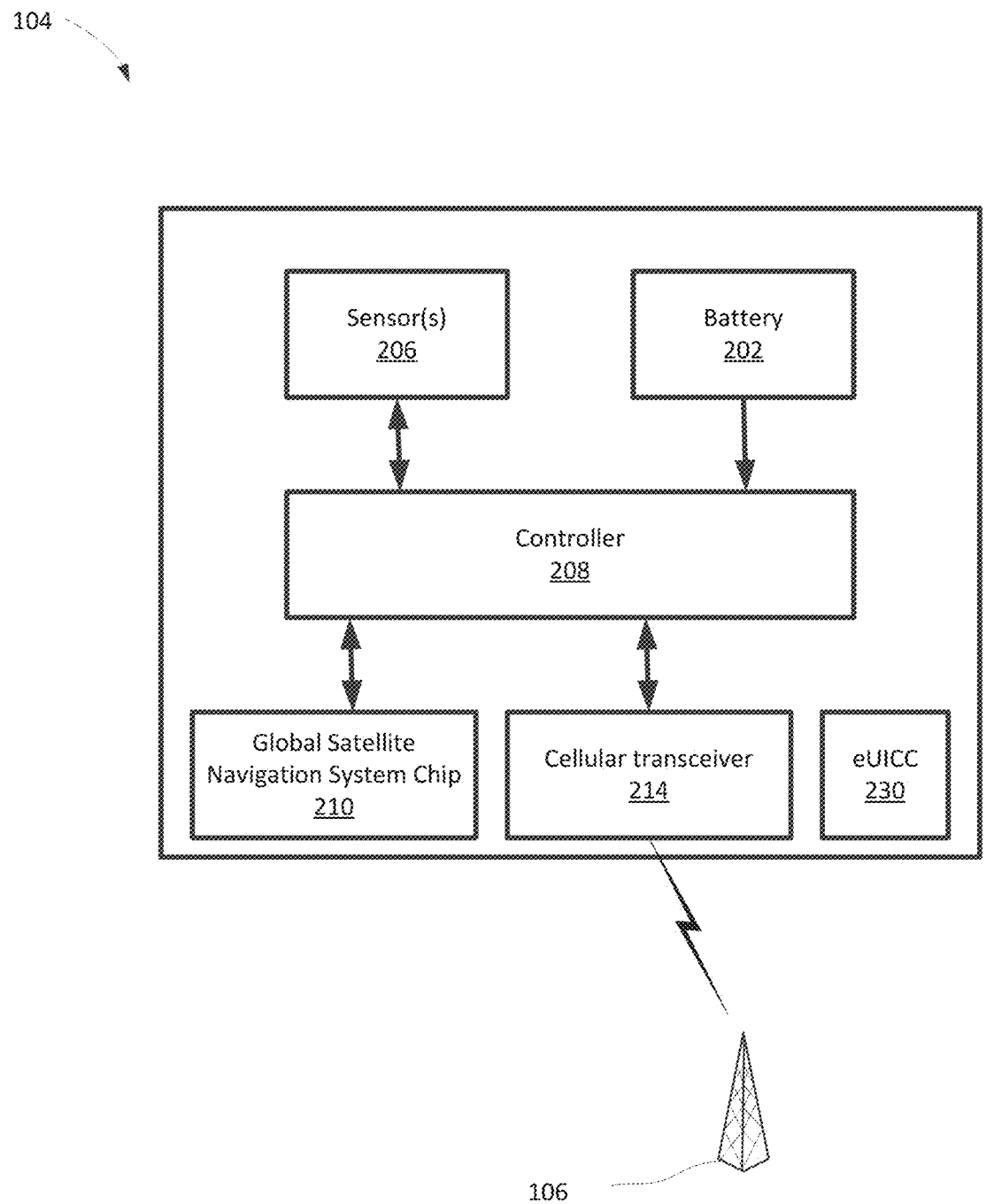
FIG. 2 illustrates in block diagram form, a simplified example of an asset tracking device.

Reference is now also made to FIG. 2, which shows, in block diagram form, one simplified example of the asset tracking device 104. The device 104 may include one or more batteries 202 to power the device 104. Battery 202 may be rechargeable or replaceable in some implementations, and the device 104 may further include battery charging circuitry (not shown) to receive charge from an external power source.

The asset tracking device 104 in this example contains one or more sensors 206, a controller 208, a GNSS chip 210, and a cellular signal transceiver 214. The one or more sensors 206 may include environmental sensors, such as IMUs, temperature sensors, humidity sensors, dust sensors, chemical sensors, etc. In some cases, the one or more sensors 206 may include load-detection sensors for determining whether a container is loaded on a chassis or the quantity of a load on a chassis. Load-detection sensors may include a millimeter wave radar sensor, a range detector, strain gauge, switch, laser, Hall effect sensor, Time-of-Flight sensor, Reid switch, etc.

The controller 208 may, in some embodiments, be a microprocessor that may be coupled to memory (not pictured). In some cases, the controller 208 may be a microcontroller, an application-specific integrated circuit (ASIC), or another such processing unit. The controller 208 may include a timer and may be configured to awaken from a lower-power state based on the timer. The controller 208 may be configured to determine when to power up the GNSS chip 210 and/or cellular signal transceiver 214, and to obtain and store in memory location data and other data from either the GNSS chip 210 or the cellular signal transceiver 214. The controller 208 may control the cellular signal transceiver 214 and cause it to obtain a data connection with a cellular tower 106 to connect to a mobile network and to send and receive data with the central server (not shown).

The GNSS chip 210 receives location data from a plurality of satellites. The GNSS chip 210 may operate in accordance with one or more satellite location determination protocols, such as the Global Positioning System (GPS), Global Navigation Satellite System (GLONASS), BeiDou Navigation Satellite System, Galileo Satellite Navigation System, Indian Regional Navigation Satellite System (IRNSS)/NavIC, or others. The GNSS chip 210 may be configured to determine, based on received satellite signals from three or more satellites, and output a set of geographic coordinates representing the geolocation of the device 104.

The cellular signal transceiver 214 receives data from signals broadcast by a plurality of cellular signal towers 106. This data may include cellular tower identifiers, mobile network identifiers, mobile operator identifiers, timestamps, received signal strength measurements, and other such data. The device 104 or the central server (not shown) may be configured to determine a geolocation from the data using cellular triangulation.

The geolocation data, cellular data, sensor data, and other data collected by the controller 208 during a wakeful period may be saved in memory on the device 104 together with a timestamp. The controller 208 may then cause the systems of the device 104 to reenter a sleep or low power mode until next triggered by the timer and/or the IMU. When the controller 208 determines that a location report is to be sent to the central server, it may cause the cellular signal transceiver 214 to establish a wireless data connection with a mobile network, and to transmit a message to the central server containing the location report that include stored data, such as geolocation data, cellular data, sensor data, and other data.

Figure 3A:
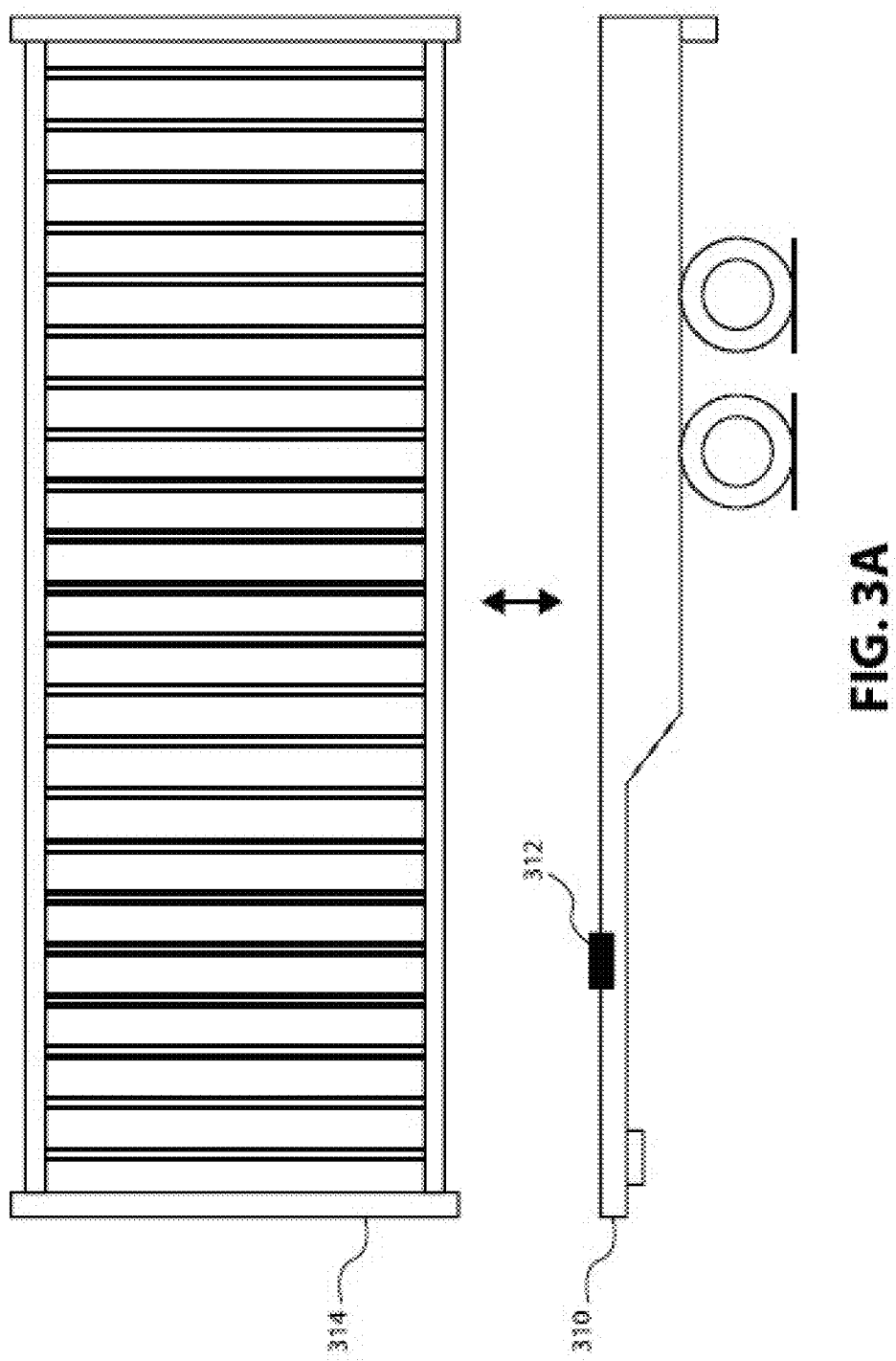
FIGS. 3A and 3B show an example asset tracking device mounted to a truck or train chassis.

Reference is now made to FIG. 3A, which diagrammatically illustrates an example truck trailer chassis 310. In one embodiment, the asset tracking device 312 may be mounted on the bed of the trailer chassis 310. The trailer chassis 310 in this example is adapted to carry a removable container, such as an intermodal 314 container. The asset tracking device 312 may be secured to other parts of the chassis 310, or may be secure inside or outside of the container 314 in some implementations.

In some embodiments wherein the asset tracking device 312 includes a plurality of parts or units, and those parts or units may be positioned separately on the trailer chassis 310 and may communicate with each other over wired or wireless communications channels.

Figure 3B:
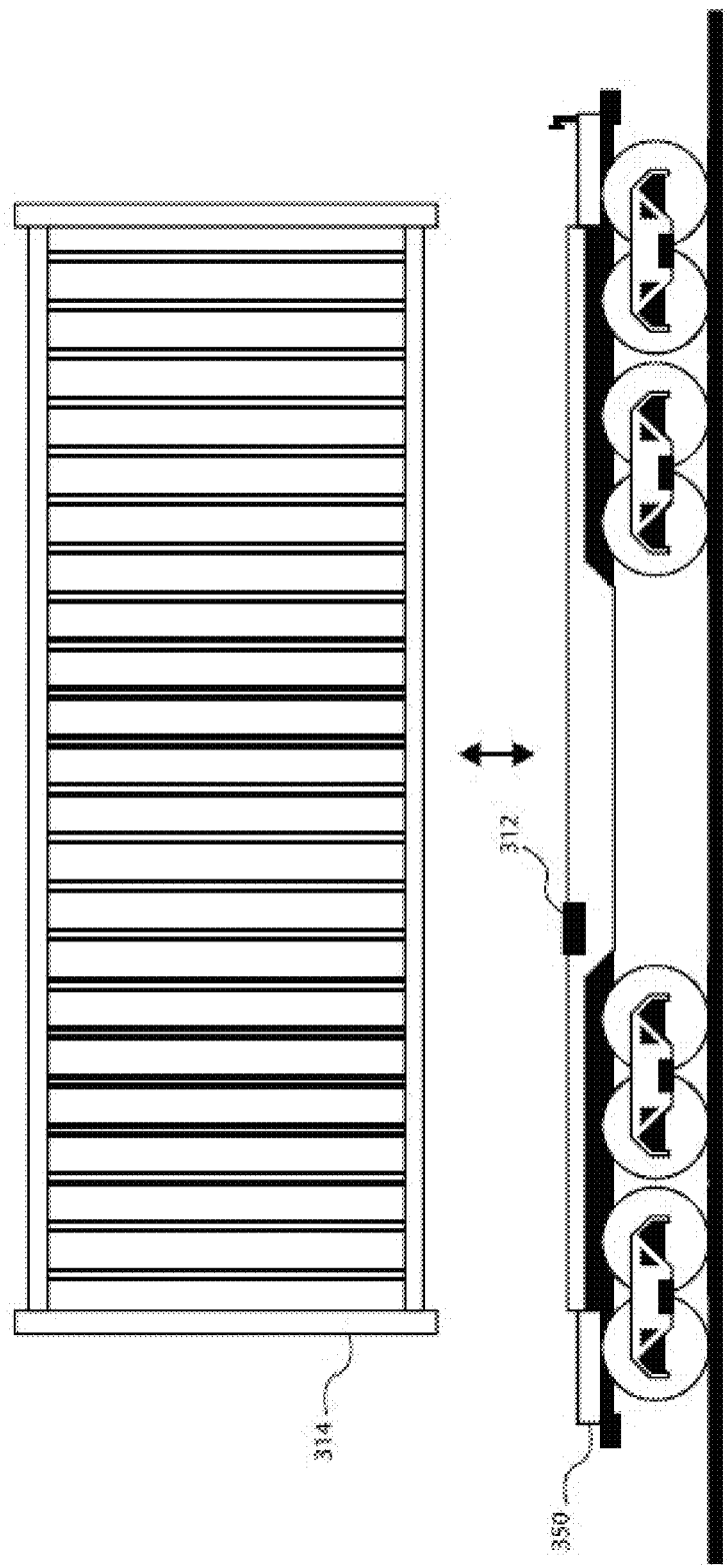

A further example is shown in FIG. 3B, which depicts an example train chassis 350 to which the example asset tracking device 312 is mounted.

With reference again to FIG. 1 and FIG. 2, the central server 102 may include memory 120 that stores data relating to the asset tracking devices 104. The memory 120 may further store data regarding user accounts and related authentication data and associations between user accounts and specific asset tracking devices 104. The location reports periodically received, or the data in those reports, may be stored in the memory 120 as asset tracking device location history 122. The asset tracking device location history 122 may include, for each asset tracking device 104 its associated geolocation at timestamps throughout its time in deployment. In some implementations, the memory 120 may only store a certain number or time period of most recent geolocation data so as to avoid excessive memory consumption, such as the past six or twelve months, for instance.

The asset tracking device 104, in some embodiments, may include an eSIM or eUICC 230 (embedded universal integrated circuit card) configured to permit the storage of more than one network profile and the remote provisioning of a network profile (e.g. mobile network credentials) in an over-the-air wireless provisioning operation. The eUICC 230 provides the cellular signal transceiver 214 with the network credentials for enabling establishment of a data connection with a particular mobile network operator. The credentials are associated with a mobile network plan governing the access to which the device 104 is entitled to the mobile network and the billing plan associated with network communications by the device 104.

Asset Tracking Devices and Network Coverage

As noted above, almost any mobile network operator (MNO) may have gaps in its coverage area for a geographic region. When an asset tracking device enters an area in which it cannot obtain a cellular data connection, it is unable to provide a location report to the central server. For the owner/operator associated with that asset tracking device, it may appear that the device has become unresponsive for some reason. An unresponsive tracking device may be a matter of concern, as it may indicate a device with a dead battery, a device that has been intentionally or maliciously disabled due to theft of the asset, or a device that is simply out of network coverage, for instance. Some assets have special handling requirements and the associated location reports include sensor data, such as temperature or such data, that is relevant to the safety and/or condition of the asset being tracked, and the lack of reports on that sensor data may be of particular cause for concern.

In accordance with one aspect, the present application provides systems and methods that enable generation, from a plurality of asset tracking device location reports, of a detected coverage plan for a particular MNO where the detected coverage plan includes data regarding areas of detected network connectivity by asset tracking devices via that MNO. The asset tracking device location history across a number of deployed devices includes a plurality of geographical locations and the associated MNO reported for that location. The location history data may include additional data regarding cellular connectivity at the reported location, including received signal strength data, cell tower identifiers, and other information. The location history data may be used by the central server to create a geographical information database specifying the boundaries of areas of network coverage or, conversely, the boundaries of areas of no network coverage, for one or more particular MNOs.

In another aspect, the present application describes systems and methods for causing display of a map overlay on a user device interface graphically illustrating areas of network coverage based on the detected coverage plan. In some cases, the detected coverage plan may indicate boundaries between geographic areas of detected network coverage and geographic areas without detected network coverage for a particular MNO. In some cases, the central server may receive one or more location reports from a particular asset tracking device having a geographical location proximate a boundary associated with a detected coverage plan. The central server may determine, from the location reports, a projected trajectory and/or travel path for the particular asset tracking device. In some cases, the determination of the projected trajectory or travel path may take into account historical location data for the device and/or data from a geographical information system, such as road or rail locations. The central server may determine whether the projected trajectory and/or travel path crosses a boundary associated with the detected coverage plan, indicating that the device is likely to enter a cellular dead-zone for that MNO. The central server may, in some instances, be configured to send or cause a notification at the user device in response to detecting the device within a threshold distance from a coverage area boundary or in response to determining from the projected trajectory that the device is likely to enter an area without cellular network coverage for the MNO.

Referring again to FIG. 1, the central server 102 may include a map generator 130 for reading asset tracking device location history 122 data from a plurality of location reports associated with a particular MNO and building consolidated coverage map data 132 for that MNO. The consolidated coverage map data 132 may be stored in the memory 120 in associated with an MNO identifier corresponding to the MNO.

The map generator 130 may be a software application or other software construct executed by a processor of the central server 102 to select location records from the asset tracking location history 112 corresponding to a specific MNO and to build the consolidated coverage map data 132 based on those records. In some cases, this may include generating, using a geographic information system, map data based on the geolocation data in the records. Each record may provide a pinpoint geographic location at which the MNO network provided data connectivity. In one example implementation, the map generator 130 may be configured to determine a coverage area for each record, e.g. a geographic area centered at the pinpoint geographic location. The geographic area may be a circle or other shape having a predefined radius. The radius may be dependent upon an associated RSSI or other signal strength indicator stored in the corresponding location record. For example, with a smaller RSSI there is less certainty as to which direction the applicable cellular tower would have been located from the pinpoint, making it the range of coverage that can be assumed from the record smaller. Conversely, a strong RSSI indicates solid signal strength from a tower preamble closely located to the pinpoint, making it more likely that the tower is near the pinpoint and more likely that the signal would reach areas distant from the pinpoint in all directions. Thus the radius of the coverage area may be based on the RSSI.

By building an overlapping network of coverage areas from a history of location reports across a plurality of asset tracking devices, the map generator 130 determines a detected geographical coverage area for that particular MNO, which may be stored in the memory 120 as the consolidated coverage map data 132.

In some cases, the map generator 130 may further determine, as part of generating the consolidated coverage map data 132, one or more geographic boundaries of the coverage area for the MNO. The geographic boundaries may be geographically-defined lines defining the edges of the coverage area determined by the map generator 130 based on the location reports. The geographically-defined lines separate areas of coverage from "dead-zones" in which the MNO appears to have no or poor cellular network coverage. In one alternative implementation, the consolidated coverage map data 132 contains data identifying the geographical areas and/or boundaries of the dead-zones.

Figure 4:
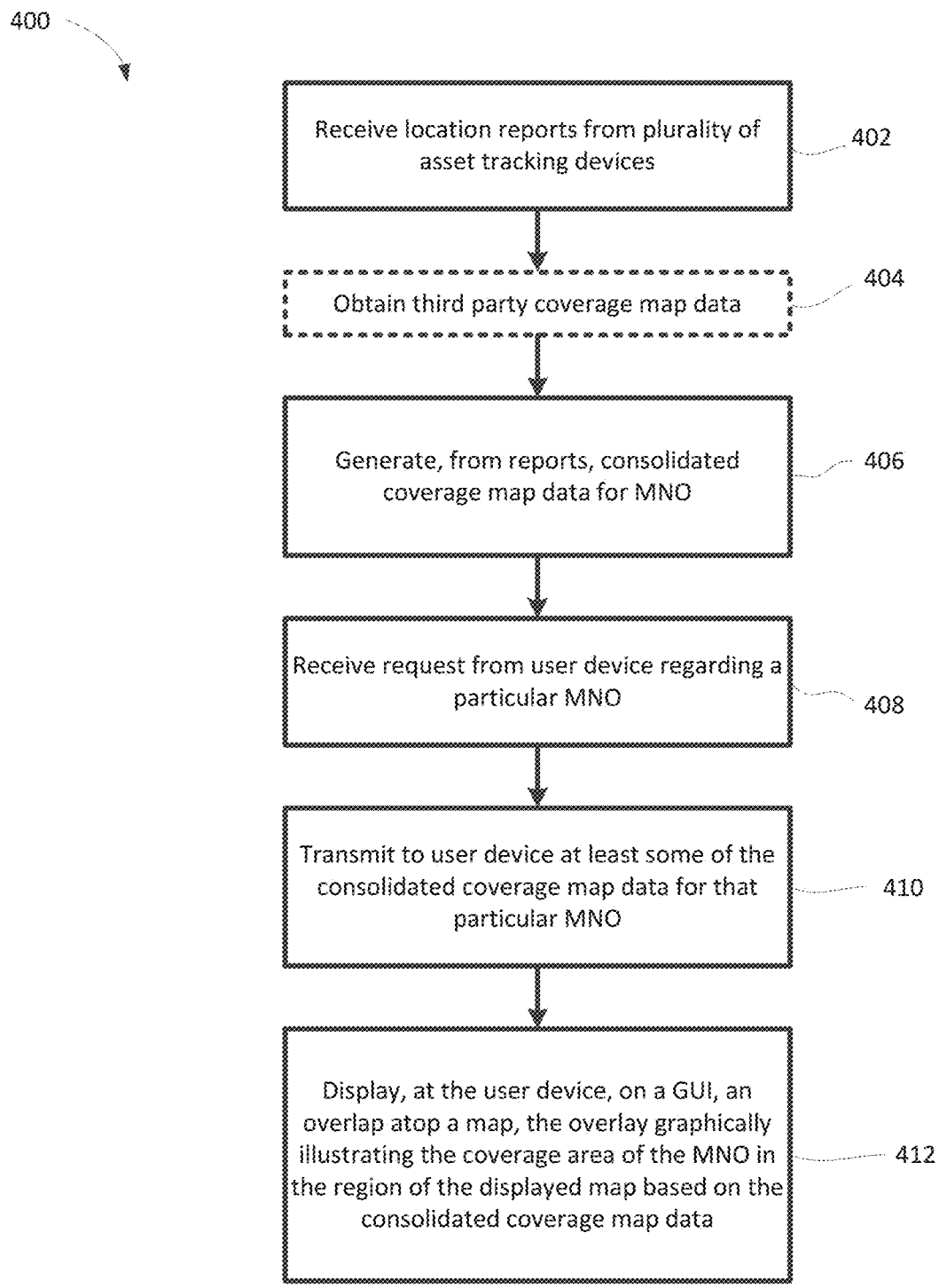
FIG. 4 shows, in flowchart form, one example method of providing a user device with data regarding an asset tracking device.

Reference is now made to FIG. 4, which shows, in flowchart form, one example method 400 of providing a user device with data regarding an asset tracking device. The method may be implemented by a computing device, such as the central server 102 (FIG. 1), for example.

The method 400 includes receiving, over a network connection, a plurality of location reports from a plurality of deployed asset tracking devices, as indicated by operation 402. Each location report may provide a geolocation, such as latitude and longitude coordinates. In some cases, the location report may provide data from which the central server may calculate a geolocation, such as a plurality of cell tower identifiers and corresponding signal strength measurements. The location report may further include an MNO identifier or another identifier from which the server can identifier the associated MNO. In many cases, each location report may include a plurality of geolocations and associated data, each associated with a respective timestamp.

In some examples, the method 400 may optionally include obtaining coverage data for an MNO from a third party source as indicated by operation 404. Various public or private third party databases may make MNO geographic coverage information available. The third party MNO coverage information may include the locations of cell towers and the respective identifiers, geographical data defining the MNO's purported coverage areas, or other such data.

In operation 406, the system may select location reports associated with a particular MNO, and may generate, from the location reports, consolidated coverage map data for that MNO. As noted above, various technique may be used to convert the pinpoint geographical location data of the location reports into coverage area data. As noted, RSSI measurements associated with each location report may be used to determine the area around the pinpoint geographical location to include in the determined consolidated coverage area.

Having determined the consolidated coverage map data for an MNO, the system may then, in operation 408, receive a request from a user device, such as the user device 110 (FIG. 1), regarding the MNO. Various user authentication and/or validation processes may be included in accepting and processing the request and associating it with a user account. The request may be associated with a specific geolocation or section of a map. In some cases, the request may be associated with one or more asset tracking devices with which the user account is associated.

In operation 410, the system may transmit at least some of the consolidated coverage map data to the user device in response to the request. To the extent that only a portion of the data is transmitted to the user device, the portion may be associated with the geographical area indicated in the request or within which the one or more associated tracking devices are currently located, based on their most recently received location reports. By providing the user device with the consolidate coverage map data, the user device has the information for graphically indicating on a geographical map the areas of cellular coverage or, conversely, the dead-zones of no or poor coverage, for the particular MNO.

As indicated by operation 412, the user device may use the consolidated coverage map data to generate and display an overlay atop of a geographical map in a graphical user interface on the user device. The overlay may graphically indicate areas of cellular coverage based on the geographical boundary data in the consolidated coverage map data and the coordinate data for the underlying map on the display. The graphical indicia may include shading or colouring the portion of the map that is inside the boundaries of the coverage area. In an alternative implementation, the graphical indicia may include shading or colouring the portion of the map that is outside the boundaries of the coverage area, i.e. the dead-zones.

In addition to the overlay, the user device may display one or more symbols on the map indicative of the current location of one or more asset tracking devices, based on geolocation data transmitted to the user device by the central server. The central server identifies the current location of asset tracking devices associated with the user account by retrieving the most recently received location reports from those devices. In some cases, the server provides additional data regarding the devices, including data from their location reports such as sensor data or other data in the location reports.

In some implementations, the user device may permit toggling of the display to switch between graphical display of the coverage area on the map and graphical display of the dead-zones on the map. In some examples, a key combination or icon or other selectable element may be used to switch between display types.

The operation of generating the overlay and combining the overlay graphically with the map data may be carried out at the central server instead of at the user device, and the combined map and overlay may be transmitted from the central server to the user device for display on the user device.

By providing users with MNO coverage data sourced from asset tracking devices, and that can be graphically illustrated on the user device as an overlay to a map, the users are able to visually identify whether their asset tracking devices are within a coverage area of a given MNO. In some cases, the central server may provide the user device with consolidated coverage area data for two or more MNOs operating in a geographical area. The user may then switch between overlays corresponding to the respective MNOs to visually evaluate differences in coverage areas. This may aid in selecting an MNO with a coverage area that corresponds to the routes of interest to the user. In some cases, the overlays for two or more MNOs may be displayed at the same time to enable direct comparison of coverage areas. In some cases, the display may include visual indicators of the historical routes or paths of one or more of the associated asset tracking devices, thereby enabling the user to determined whether a particular MNO's coverage area covers the routes and paths traversed by the asset tracking devices.

The central server may be configured, on receipt of a location report from a particular asset tracking device, to determine the MNO identified by the location report and, based on the consolidated coverage map data for that MNO, determine whether the asset tracking device is within a threshold distance to a boundary of the coverage area for that MNO. An asset tracking device within the threshold distance of the boundary of the coverage area may be at risk of going into a dead-zone and being unable to reestablish data connectivity via the MNO's mobile network. The threshold distance may be about 5 or 10 kilometers, for example.

If an asset tracking device is determined to be within the threshold distance of the boundary, then the central server may be configured to sent a message or notification to the user device. In some cases, the message or notification may be output on the display. The user device may present the message or notification as a pop-up window in some cases. The user device may indicate the message or notification through use of a particular symbol or color in rendering an icon associated with the location of the asset tracking device on the display. The message or notification may be configured as auditory notification in some cases.

Figure 5:
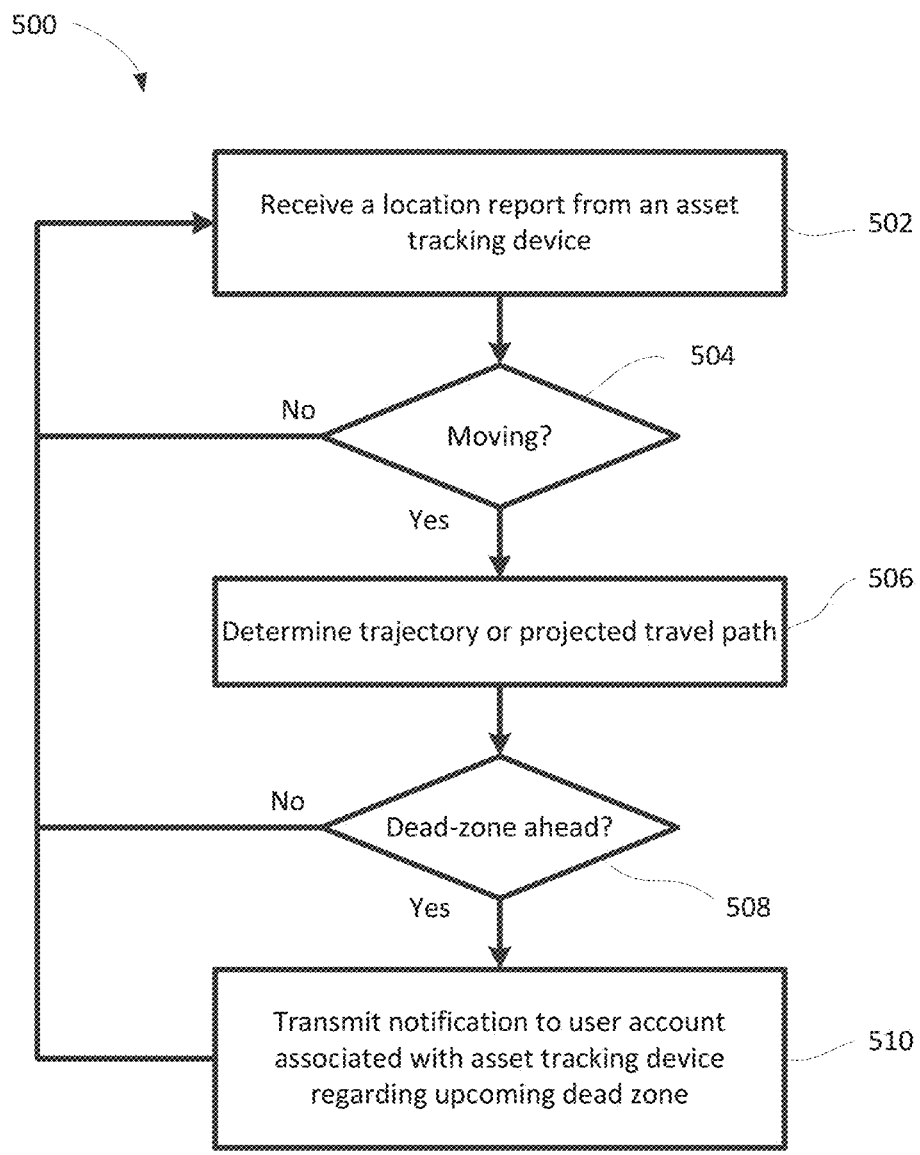
FIG. 5 shows, in flowchart form, an example method of alerting a user account to a likely loss of data connectivity for an associated asset tracking device.

In one example implementation, the system may attempt to determine a likely loss of data connectivity for an asset tracking device by determining the device's path or trajectory and then determining whether that path or trajectory crosses a boundary of the MNO's coverage area. Reference is now made to FIG. 5, which shows an example method 500 of alerting a user account to a likely loss of data connectivity for an associated asset tracking device. The method 500 may be implemented by one or more computing devices, such as the central server 102 (FIG. 1), as an example. The method 500 assumes that the computing device has built or obtain geographic mobile network coverage map data associated with a particular MNO or a plurality of MNOs. The coverage map data may include data defining the geographic boundary of the coverage area or, conversely, the geographic boundary of the dead-zone(s) for which there is no or poor mobile network coverage.

In operation 502, the computing device receives, over a computing network, a location report from an asset tracking device. The location report is associated with a particular MNO. The location report may contain an MNC or other identifier for the MNO. In some cases, the location report includes one geolocation. In some cases, the location report includes a series of geolocations, each with a timestamp reflecting the time at which the asset tracking device determined that geolocation.

In operation 504, the computing device may determine whether the device is moving. The determination in operation 504 may include comparing a most-recent geolocation with one more earlier geolocations. Those geolocations may be in the location report or may be stored in memory at the computing device based on a previously-received location report from the device. More than a threshold change in the current geolocation from an earlier most-recently-reported geolocation may be indicative of a device in motion. In some cases, the determination may be based on sensor data in the location report, which may include data regarding device speed or other data from an IMU in the device. If the device is determined to be stationary, then the method 500 may return to operation 502 to await a further report.

If the device is in motion, then in operation 506, the computing device may determine a trajectory or path of the device. The determination of the trajectory may be based on the current geolocation indicated in the location report and one or more prior geolocations indicated in the location report or in earlier-received location reports. In a simplest implementation, the trajectory is based on determining a line passing through the current geolocation and the most-recent geolocation. The trajectory may be based on determining a best fit line using three or more geolocations. In some cases, the trajectory or path may be determined based on one or more geolocations reported by the device and data from a geographic information system indicating travel paths, such as roads, train tracks, etc., and selecting one of the travel paths and a direction based on the reported geolocations. In a further example, the determination of the path may be further based on a history of geolocations and/or travel paths associated with that asset tracking device.

In some cases, the determination of a trajectory or path in operation 506 may be implemented using a machine learning model (MLM) trained on a training data set of geolocation reports and actual travel paths. The MLM may receive two or more of the geolocations reported by the asset tracking device and output a determined travel path or trajectory. In some cases, the MLM may also output a confidence measure indicating a probability that the travel path is accurate.

In operation 508, the computing device may determine whether the device is likely to enter a dead-zone. In some implementations, operation 508 may be implemented by comparing the determined travel path or trajectory and consolidated coverage map data for the MNO used by the asset tracking device to determined whether the travel path is projected to cross into a dead-zone. The consolidated coverage map data may include geographical data defining boundaries of the coverage area in some cases. Operation 508 may include comparing the travel path determining in operation 506 and the defined boundaries to determine if they intercept.

In some cases, the determination that the device is likely to enter a dead-zone may also be partly based on whether the intersection between the predicted travel path and the geographic boundary is within a threshold distance or time. That is, if the projected crossing of the boundary is not expected to occur for hundreds of kilometers, or a certain number of hours, then the projected boundary-crossing event may be too far into the future to be considered likely. However, if the projected boundary-crossing event is predicted to occur within a threshold distance or time, then it may be identified as a likely dead-zone crossing.

If the computing device determines in operation 508 that the asset tracking device is likely to cross into a dead-zero such that it will likely be unable to obtain data connectivity, then the computing device may send a message, notification, or other communication to a user account associated with the asset tracking device. The communication may be a notification on an associated mobile app, an email, a text message, a social media message, or other such communication sent to one or more user devices associated with the user account.

Automated Mobile Profile Selection and Provisioning

Referring again to FIG. 1, in a typical situation a manufacturer and/or seller of the asset tracking devices 104, and/or an operator of the central server 102, (collectively referred to herein as an "administrator") sell or provide the asset tracking devices 104 to owners/operators that wish to use the devices 104 to track their assets. The administrator (and sometimes the owner/operator) may not know in advance where the asset tracking devices 104 will be used or how. In some cases, they may be put onto containers that travel the world and cross international borders regularly, such as shipping containers. In some cases, they may be deployed on routes that stay within one or a few countries, such as a trucking or train chassis within the European Union or North America, for example. In some cases, they may be deployed such that they stay within one country or state and traverse a fixed route regularly, such as on a truck or train that consistently travels back-and-forth between two endpoints. Because of this uncertainty the asset tracking devices 104 may be provisioned with a relatively expensive international coverage plan that provides for maximum flexibility and functionality in obtaining network connectivity so that the owners/operators are able to use the devices 104 in any setting.

In accordance with another aspect of the present application, the central server 102 may include an MNO rate plan selection machine 150 configured to periodically select a mobile network plan for an asset tracking device and to provision the asset tracking device with a mobile network profile to enable it to use the selected mobile network plan, when the selected plan necessitates changes in credentials at the asset tracking device. The MNO rate plan selection machine 150 may be implemented using a fixed rule set or using a machine learning model. The server 102 may be configured to accumulate location reports from a particular asset tracking device and to input the reports to the MNO rate plan selection machine 150. The machine 150 may also receive rate plan data 152 for two or more MNOs as an input. In some cases, the machine 150 may further receive the geographical coverage information for each MNO as an input, e.g. the consolidated coverage map data 132 in some cases.

Based on the location history of the asset tracking device, the machine 150 may identify a lowest-cost or optimal MNO mobile network rate plan from among the MNO rate plan data 152 that still provides coverage for the locations identified in the location history. For example, an asset that does a regular run back and forth between two cities may be one that the machine 150 identifies as more cost effectively served by a local in-country plan of a particular MNO, rather than a most-expensive most-flexible international rate plan. The determination by the machine 150 may be performed monthly, annually, bi-annually, or at some other frequency. The frequency may be set based on the ability to change rate plans without cost penalty. The determination of device route and geographic constraints, i.e. network location requirements, may be based on an analysis that produces a confidence measure or metric that must exceed a threshold. For example, a relatively new asset tracking device with a short history and a set of disparate location routes may result in a very low confidence measure regarding the travel constraints (the network location requirements) of that asset tracking devices; however, an asset tracking device that has been deployed for a longer period of time and that has a relatively consistent location history (e.g. travel between two three cities, or travel only within one country) may have a relatively high confidence measure regarding its network location requirements.

The central server 102 may include an eUICC provisioning module 140 configured to cause the provisioning of new or updated credentials over-the-air to an asset tracking device on the basis of a rate plan and MNO selected by the MNO rate plan selection machine 150. Those ordinarily skilled in the art of telecommunications will be familiar with eUICC wireless provisioning. The provisioning may be carried out in accordance with standardized protocols for remote eSIM or eUICC provisioning, such as the SGP.22 Technical Specification v. 2.2.2 published by the GSM Association, for example. The eUICC provisioning module 140 may be configured to communicate with a Subscription Manager (SM) or other computing elements within the mobile network architecture to cause the provisioning of needed credentials and profile data to an asset tracking device so as to enable use by the device of a particular MNO rate plan.

Figure 6:
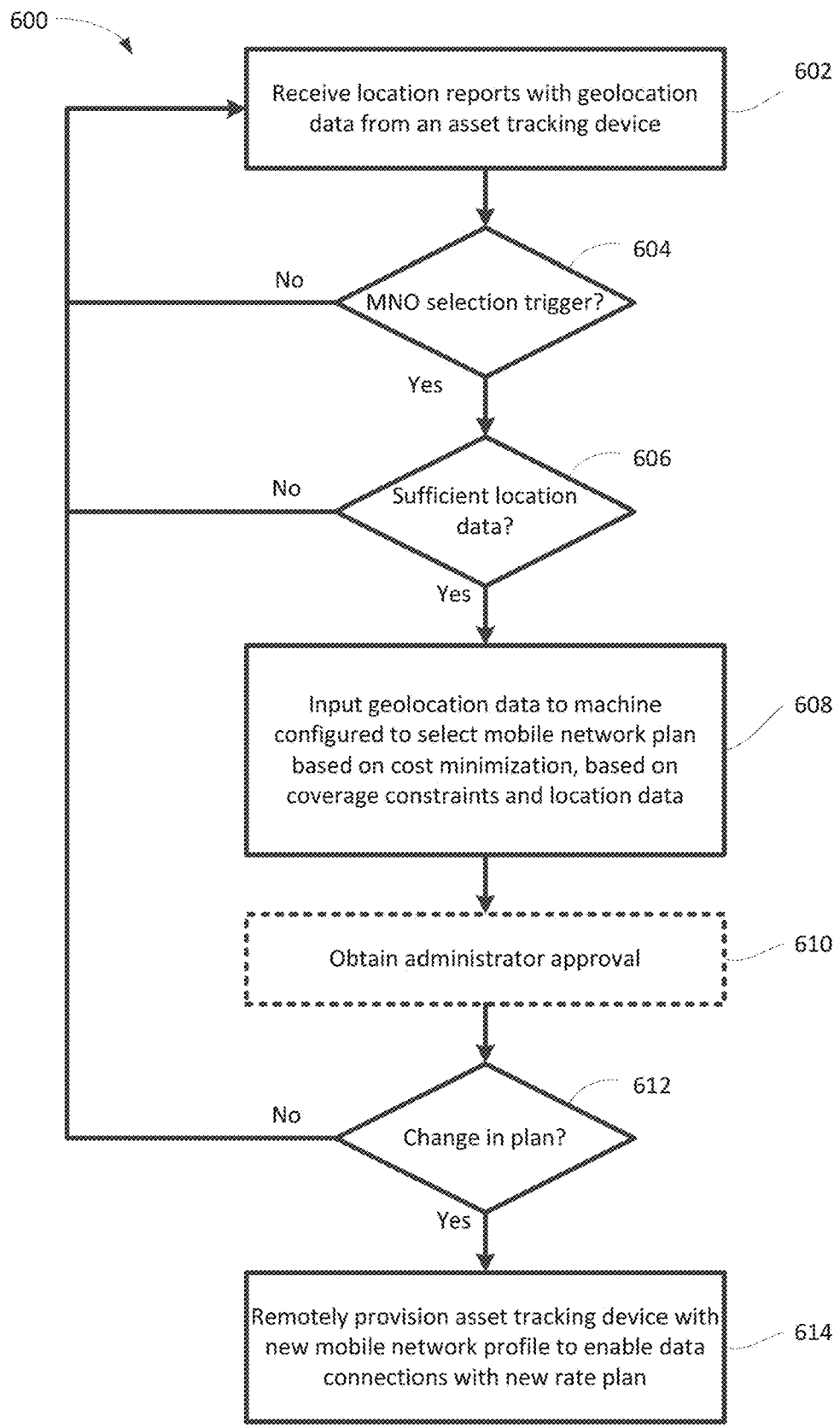
FIG. 6 shows, in flowchart form, an example method for selecting a mobile network profile for an asset tracking device.

Reference will now be made to FIG. 6, which shows, in flowchart form, one example method 600 for selecting a mobile network profile for an asset tracking device. The method 600 may be implemented by a suitably-programmed computing device, such as the central server 102 (FIG. 1), as an example.

In operation 602, the computing device receives one or more location reports from a particular asset tracking device. As noted above, the location reports may include one or more geolocation pinpoints indicating the devices location in a global coordinate system. In some cases, a location report may provide cellular tower data or other such data from which the computing device may determine a geolocation using cellular triangulation or other such technique. The location reports provide the computing device with a history of the asset tracking device's location over time.

In operation 604, the computing device may determine whether a mobile network plan selection is triggered. The trigger may be a regular periodic time-based trigger, such as daily, monthly, bi-monthly, semi-annually, annually, or with some other frequency. In some cases, the trigger frequency is set based on a current rate plan renewal frequency. In some cases, the trigger frequency is set for this particular asset tracking device, such that the computing device maintains a timer or other setting in memory in association with the asset tracking device that notifies the computing device when the mobile network plan selection is to occur for that device, and the timing may be different for other devices.

In some cases, the trigger alternatively or additionally be based on other factors, such as measured device usage being above or below a threshold setting. For example, if the device is on an expensive international rate plan but the device usage indicates infrequent data usage with a single MNO, then the computing device may trigger the rate plan selection process. Or the device may be on a more restricted plan and may be subject to data usage overage charges and/or roaming charges at a billing cycle end period, which may also trigger the rate plan selection process.

If the rate plan selection process is triggered in operation 604, then in operation 606 the computing device determines whether sufficient location data has been received from the asset tracking device to continue the selection process. In some cases, there may be a minimum number of location reports or geolocation pinpoints required. In some cases, there may be a minimum number of "trips" defined as a movement between one long term (e.g. more than 8 hours) resting point and another long term resting point, or movement of the device by at least a minimum threshold distance, such as 10, 50, or 100 kilometers.

The computing device may determine a confidence measure from the accumulated location reports from the asset tracking device, where the confidence measure is a measure of to what extent the location reports demonstrate a travel range for the asset tracking device. The travel history of the device may be evaluated by the computing device to produce the confidence measure or metric, which is then compared to a threshold value to determine whether to continue the method 600. For example, a relatively new asset tracking device with a short history of location reports and a set of disparate location routes may result in a very low confidence measure regarding the expected travel constraints (the network location requirements) of that asset tracking device. Conversely, an asset tracking device that has been deployed for a longer period of time, with a more extensive history of location reports, and that has a relatively consistent location history (e.g. travel between two three cities, or travel only within one country) may have a relatively high confidence measure regarding its network location requirements. The computing device may take into account the number of geolocation pinpoints, the number of 'trips', a measure of the variance in geolocation pinpoints or trip routes, and other factors in determining the confidence measure.

If the computing device determines that it has sufficient location data for the asset tracking device in operation 606, and/or that the confidence measure is sufficiently high, then in operation 608 it inputs at least some of the geolocation data for the asset tracking device to an MNO rate plan selection machine. In some cases, all the geolocation data for the asset tracking device may be used. In some cases, the computing device may restrict the geolocation data to the most recent geolocation data, e.g. the last month, six months, year, or some other time period.

The MNO rate plan selection machine outputs, based on the input geolocation data for the device and a set of possible MNO rate plans, a selected MNO rate plan from among the possible plans. The machine may be configured to select the plan based on a constraint of ensuring network coverage by the plan for the geographic locations that the device travels within. In that regard, the machine may also receive as an input network coverage data for each MNO. In some cases, the network coverage data is obtained based on crowd-sourced data from the plurality of deployed asset tracking devices, such as the consolidated coverage map data.

The machine may be configured to minimize a cost optimization expression in some implementations, where the cost optimization expression take into account the various possible MNO rate plans, the device location ranges, associated roaming fee, and other such factors in determining a projected cost for each of the candidate plans. The machine then selects the plan with the lowest calculated projected cost. In some cases, the machine may be implemented using a machine learning algorithm so as to generate a machine learning model that produces a selected plan as an output from the input location data, coverage information, and set of possible rate plans.

The computing device may be configured to seek administrator or user approval of a change in rate plans in some implementations, as indicated by operation 610. This may include sending a notification to the administrator or the owner of the asset tracking device. The notification may include a selectable link or other GUI element enabling approval of the change. In some cases, the computing device may determine from an associated user profile or other such stored data that no pre-approval is required for a change in rate plans.

In operation 612, the computing device determines from the selected plan identified by the machine whether the asset tracking device requires new credentials or a new or updated mobile network profile in order to access the selected plan. In some cases, the selected plan is the plan already used by the asset tracking device, meaning no changes are required. In some cases, the selected plan may be a different plan with the same MNO, and the change may be implemented through the sending of communications between the central server and the MNO without necessarily requiring a change at the asset tracking device. However, some instance the selection of a different plan with the same MNO, or the transition to a new plan with a different MNO may necessitate a change in the profile at the asset tracking device.

If a change is required, then in operation 614, the computing device causes the remote provisioning of a mobile network profile and/or associated credentials to the asset tracking device. The provisioned mobile network profile enables the asset tracking device to obtain data connectivity with an MNO in accordance with the MNO rate plan selected by the machine.

Figure 7A:
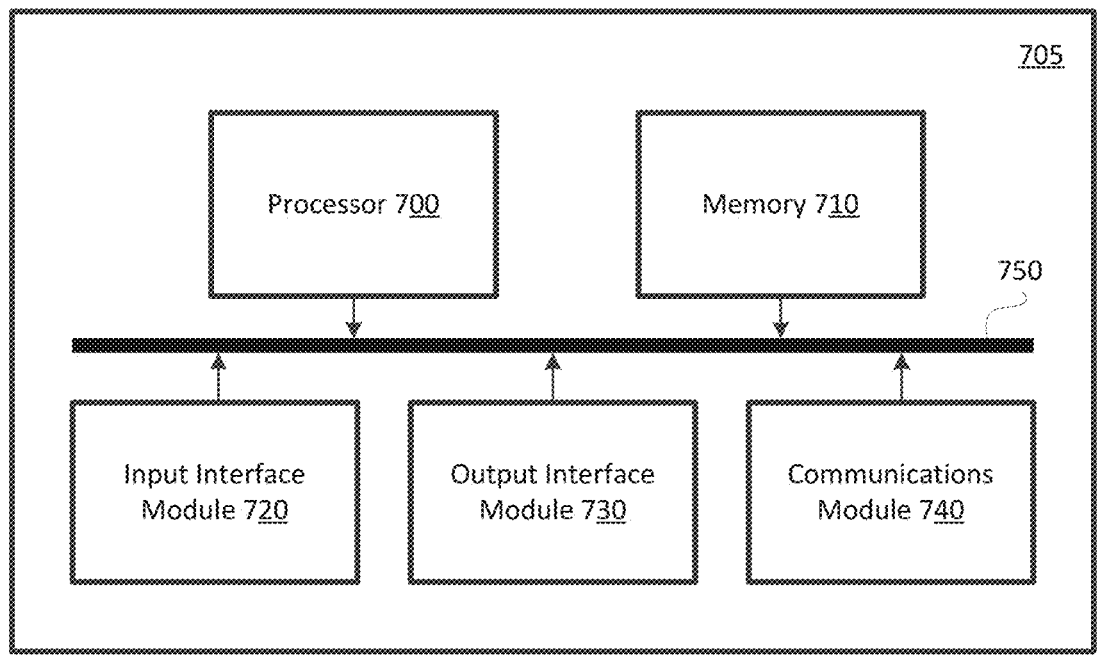
FIG. 7A shows a diagram of an example computing device.

One or more of the above-described methods may be implemented by way of a suitably programmed computing device. FIG. 7A is a high-level operation diagram of an example computing device 705. The example computing device 705 includes a variety of modules. For example, as illustrated, the example computing device 705, may include a processor 700, a memory 710, an input interface module 720, an output interface module 730, and a communications module 740. As illustrated, the foregoing example modules of the example computing device 705 are in communication over a bus 750.

The processor 700 is a hardware processor. The processor 700 may, for example, be one or more ARM, Intel x86, PowerPC processors or the like.

The memory 710 allows data to be stored and retrieved. The memory 710 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 705.

The input interface module 720 allows the example computing device 705 to receive input signals. Input signals may, for example, correspond to input received from a user. The input interface module 720 may serve to interconnect the example computing device 705 with one or more input devices. Input signals may be received from input devices by the input interface module 720. Input devices may, for example, include one or more of a touchscreen input, keyboard, trackball or the like. In some embodiments, all or a portion of the input interface module 720 may be integrated with an input device. For example, the input interface module 720 may be integrated with one of the aforementioned examples of input devices.

The output interface module 730 allows the example computing device 705 to provide output signals. Some output signals may, for example allow provision of output to a user. The output interface module 730 may serve to interconnect the example computing device 705 with one or more output devices. Output signals may be sent to output devices by output interface module 730. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 730 may be integrated with an output device. For example, the output interface module 730 may be integrated with one of the aforementioned example output devices.

The communications module 740 allows the example computing device 705 to communicate with other electronic devices and/or various communications networks. For example, the communications module 740 may allow the example computing device 705 to send or receive communications signals. Communications signals may be sent or received according to one or more protocols or according to one or more standards. For example, the communications module 740 may allow the example computing device 705 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 740 may allow the example computing device 705 to communicate using near-field communication (NFC), via Wi-Fi™, using Bluetooth™ or via some combination of one or more networks or protocols. Contactless payments may be made using NFC. In some embodiments, all or a portion of the communications module 740 may be integrated into a component of the example computing device 705. For example, the communications module may be integrated into a communications chipset.

Software instructions are executed by the processor 700 from a computer-readable medium. For example, software may be loaded into random-access memory from persistent storage of memory 710. Additionally, or alternatively, instructions may be executed by the processor 700 directly from read-only memory of memory 710.

Figure 7B:
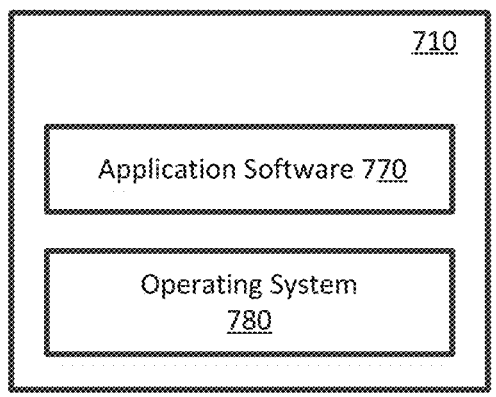
FIG. 7B shows a simplified organization of software components stored in memory of an example computing device.

FIG. 7B depicts a simplified organization of software components stored in memory 710 of the example computing device 705. As illustrated these software components include an operating system 780 and application software 770.

The operating system 780 is software. The operating system 780 allows the application software 770 to access the processor 700, the memory 710, the input interface module 720, the output interface module 730, and the communications module 740. The operating system 780 may be, for example, Apple™ OS X, Android™, Microsoft™ Windows™, QNX OS, a Linux distribution, or the like.

The application software 770 adapts the example computing device 705, in combination with the operating system 780, to operate as a device performing particular functions.

The example computing device 705 may be used to implement the user device 110 (FIG. 1) in some examples. The example computing device 705 may be used to implement the central server 102 (FIG. 1) in some examples.

It will be appreciated that it may be that some or all of the above-described operations of the various above-described example methods may be performed in orders other than those illustrated and/or may be performed concurrently without varying the overall operation of those methods. It will also be appreciated that some or all of the above-described operations of the various above-described example methods may be performed in response to other above-described operations.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Although some of the above examples may refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

Certain adaptations and modifications of the described embodiments can be made. Therefore, the above discussed embodiments are considered to be illustrative and not restrictive.

What is claimed is:

1. A computer-implemented method, the method comprising:
receiving, over a computer network, and storing, a plurality of location reports from an asset tracking device, each of the location reports including, at least, geolocation data and a mobile network identifier, wherein the asset tracking device operates using a first mobile network plan associated with a first mobile network operator, the geolocation data providing a location history for the asset tracking device;
detecting a trigger to re-determine a mobile network plan on which the asset tracking device operates and, in response,
inputting the geolocation data for the asset tracking device to a machine learning model configured to select a cost-optimized mobile network plan from among a set of defined mobile network plans based on the geolocation data; and
comparing the cost-optimized mobile network plan with the first mobile network plan and, responsive to the comparison,
causing provisioning of subscription credentials to the asset tracking device to enable it to obtain network connectivity using the cost-optimized mobile network plan.

2. The method of claim 1, wherein the trigger includes a periodically-occurring time.

3. The method of claim 2, wherein the periodically-occurring time has a period of monthly, bi-monthly, semi-annually, or annually.

4. The method of claim 1, wherein detecting the trigger includes detecting a change in the set of defined mobile network plans.

5. The method of claim 1, wherein detecting the trigger further includes determining that the plurality of location reports include more than a minimum number of geolocation pinpoints for the asset tracking device.

6. The method of claim 1, wherein detecting the trigger further includes determining that the plurality of location reports define more than a minimum threshold number of trips by the asset tracking device.

7. The method of claim 1, wherein detecting the trigger further includes determining, from the plurality of location reports, a confidence measure indicative of a probability that the geolocation data indicates a location range for the asset tracking device.

8. The method of claim 7, wherein determining the confidence measure is partly based on a count of trips or a count of geolocation data pinpoints represented by the plurality of location reports, and partly based on a determining a variance value with respect to the trips or the geolocation data pinpoints.

9. The method of claim 1, wherein inputting the geolocation data further includes inputting, to the machine learning model, mobile network coverage data for each mobile network in the set of defined mobile network plans.

10. A system comprising:
a processor;

a memory storing processor executable instructions that, when executed by the processor, cause the processor to:
receive, over a computer network, and store, a plurality of location reports from an asset tracking device, each of the location reports including, at least, geo-location data and a mobile network identifier, wherein the asset tracking device operates using a first mobile network plan associated with a first mobile network operator, the geolocation data providing a location history for the asset tracking device;
detect a trigger to re-determine a mobile network plan on which the asset tracking device operates and, in response,
input the geolocation data for the asset tracking device to a machine learning model configured to select a cost-optimized mobile network plan from among a set of defined mobile network plans based on the geolocation data; and
compare the cost-optimized mobile network plan with the first mobile network plan and, responsive to the comparison,
cause provisioning of subscription credentials to the asset tracking device to enable it to obtain network connectivity using the cost-optimized mobile network plan.

11. The system of claim 10, wherein the trigger includes a periodically-occurring time.

12. The system of claim 11, wherein the periodically-occurring time has a period of monthly, bi-monthly, semi-annually, or annually.

13. The system of claim 10, wherein the instructions, when executed, are to cause the processor to detect the trigger by at least detecting a change in the set of defined mobile network plans.

14. The system of claim 10, wherein the instructions, when executed, are to cause the processor to detect the trigger by at least determining that the plurality of location reports include more than a minimum number of geolocation pinpoints for the asset tracking device.

15. The system of claim 10, wherein the instructions, when executed, are to cause the processor to detect the trigger by at least determining that the plurality of location reports define more than a minimum threshold number of trips by the asset tracking device.

16. The system of claim 10, wherein the instructions, when executed, are to cause the processor to detect the trigger by at least determining, from the plurality of location reports, a confidence measure indicative of a probability that the geolocation data indicates a location range for the asset tracking device.

17. The system of claim 16, wherein the instructions, when executed, are to cause the processor to determine the confidence measure partly based on a count of trips or a count of geolocation data pinpoints represented by the plurality of location reports, and partly based on a determining a variance value with respect to the trips or the geolocation data pinpoints.

18. The system of claim 10, wherein the instructions, when executed, are to cause the processor to input the geolocation data by further inputting, to the machine learning model, mobile network coverage data for each mobile network in the set of defined mobile network plans.

19. A non-transitory computer-readable medium storing processor-executable instructions that, when executed by a processor, are to cause the processor to:
receive, over a computer network, and store, a plurality of location reports from an asset tracking device, each of the location reports including, at least, geolocation data and a mobile network identifier, wherein the asset tracking device operates using a first mobile network plan associated with a first mobile network operator, the geolocation data providing a location history for the asset tracking device;
detect a trigger to re-determine a mobile network plan on which the asset tracking device operates and, in response,
input the geolocation data for the asset tracking device to a machine learning model configured to select a cost-optimized mobile network plan from among a set of defined mobile network plans based on the geolocation data; and
compare the cost-optimized mobile network plan with the first mobile network plan and, responsive to the comparison,
cause provisioning of subscription credentials to the asset tracking device to enable it to obtain network connectivity using the cost-optimized mobile network plan.

20. The non-transitory computer-readable medium of claim 19, wherein the instructions, when executed, are to cause the processor to detect the trigger by at least determining, from the plurality of location reports, a confidence measure indicative of a probability that the geolocation data indicates a location range for the asset tracking device.

* * * * *